United States Patent [19]

Eagle et al.

[11] 4,346,060
[45] Aug. 24, 1982

[54] RADIAL AMMONIA CONVERTERS

[75] Inventors: Raymond S. Eagle; Vishnu A. Patel, both of Houston, Tex.

[73] Assignee: Pullman Incorporated, Chicago, Ill.

[21] Appl. No.: 134,616

[22] Filed: Mar. 27, 1980

Related U.S. Application Data

[62] Division of Ser. No. 925,137, Jul. 17, 1978, Pat. No. 4,230,669.

[51] Int. Cl.³ ............................................... C01C 1/02
[52] U.S. Cl. .................................... 422/148; 422/198; 422/218; 422/219
[58] Field of Search ............... 422/148, 189, 188, 190, 422/191, 192, 193, 195, 198, 213, 218, 181, 201, 221, 219

[56] References Cited

U.S. PATENT DOCUMENTS

| | | | |
|---|---|---|---|
| 2,887,365 | 5/1959 | De Rycke et al. | 422/148 |
| 3,041,150 | 6/1962 | Worn | 422/148 |
| 3,475,136 | 10/1969 | Eschenbrenner et al. | 422/148 |
| 4,008,050 | 2/1977 | Belt | 422/200 |
| 4,101,281 | 7/1978 | Pagani | 422/148 |
| 4,181,701 | 1/1980 | Topsoe et al. | 422/192 |

FOREIGN PATENT DOCUMENTS 295319  3/1968  U.S.S.R. .......................... 422/148

*Primary Examiner*—William F. Smith
*Attorney, Agent, or Firm*—C. W. Crady; Kurt S. Myers

[57] ABSTRACT

A radial ammonia converter system including first and second heat interchangers and first, second and third catalyst beds. The synthesis gas is heated in said first and second interchangers by catalyst bed effluent prior to full flow through each of the catalyst beds. In one embodiment, two of the catalyst beds are mounted with the first and second interchangers in one vessel; and in another embodiment, the first interchanger and second catalyst bed are mounted in one vessel and the second interchanger and first catalyst bed are mounted in a separate vessel. In both embodiments, the radial ammonia converter system is completed by a third catalyst bed in a separate vessel.

6 Claims, 8 Drawing Figures

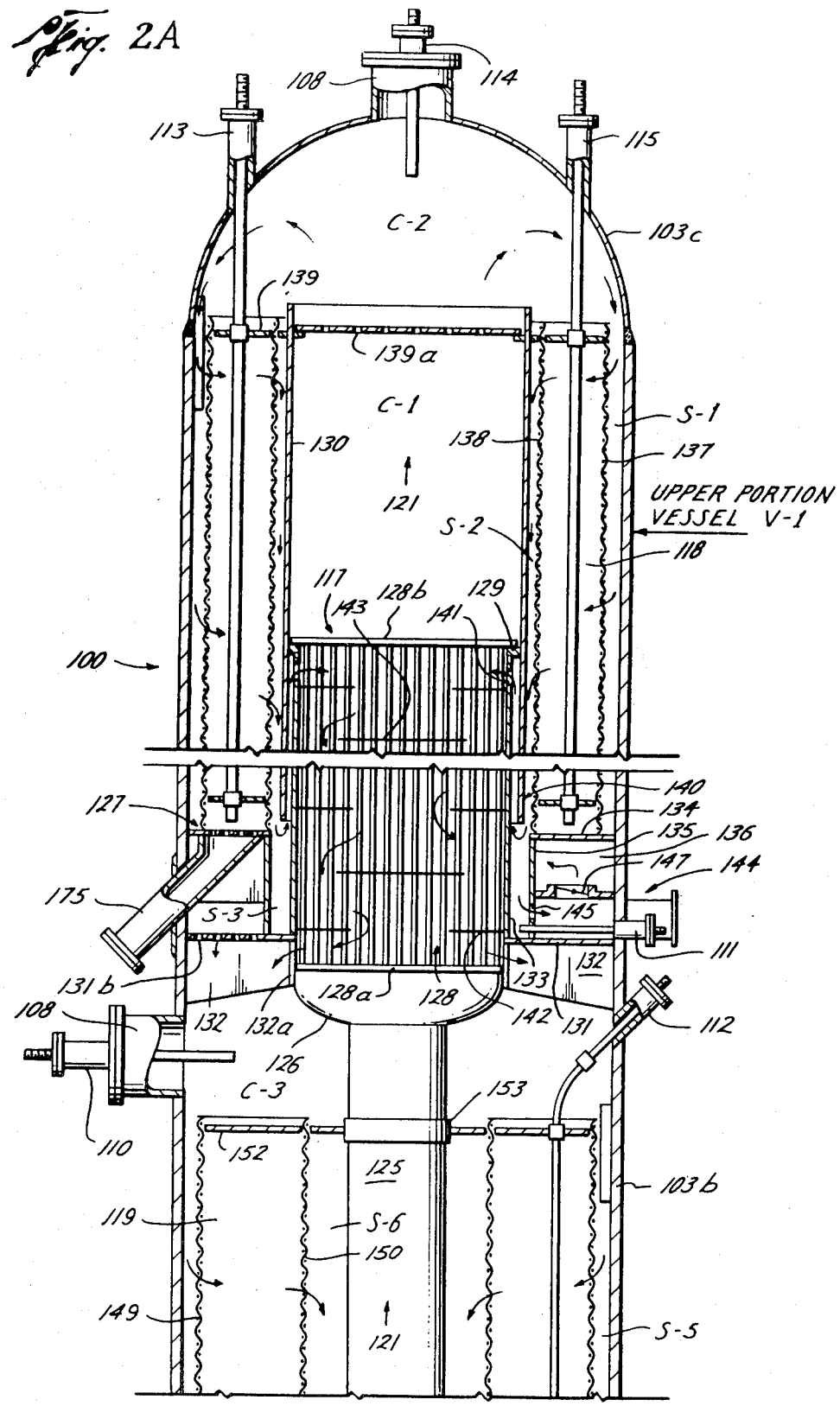

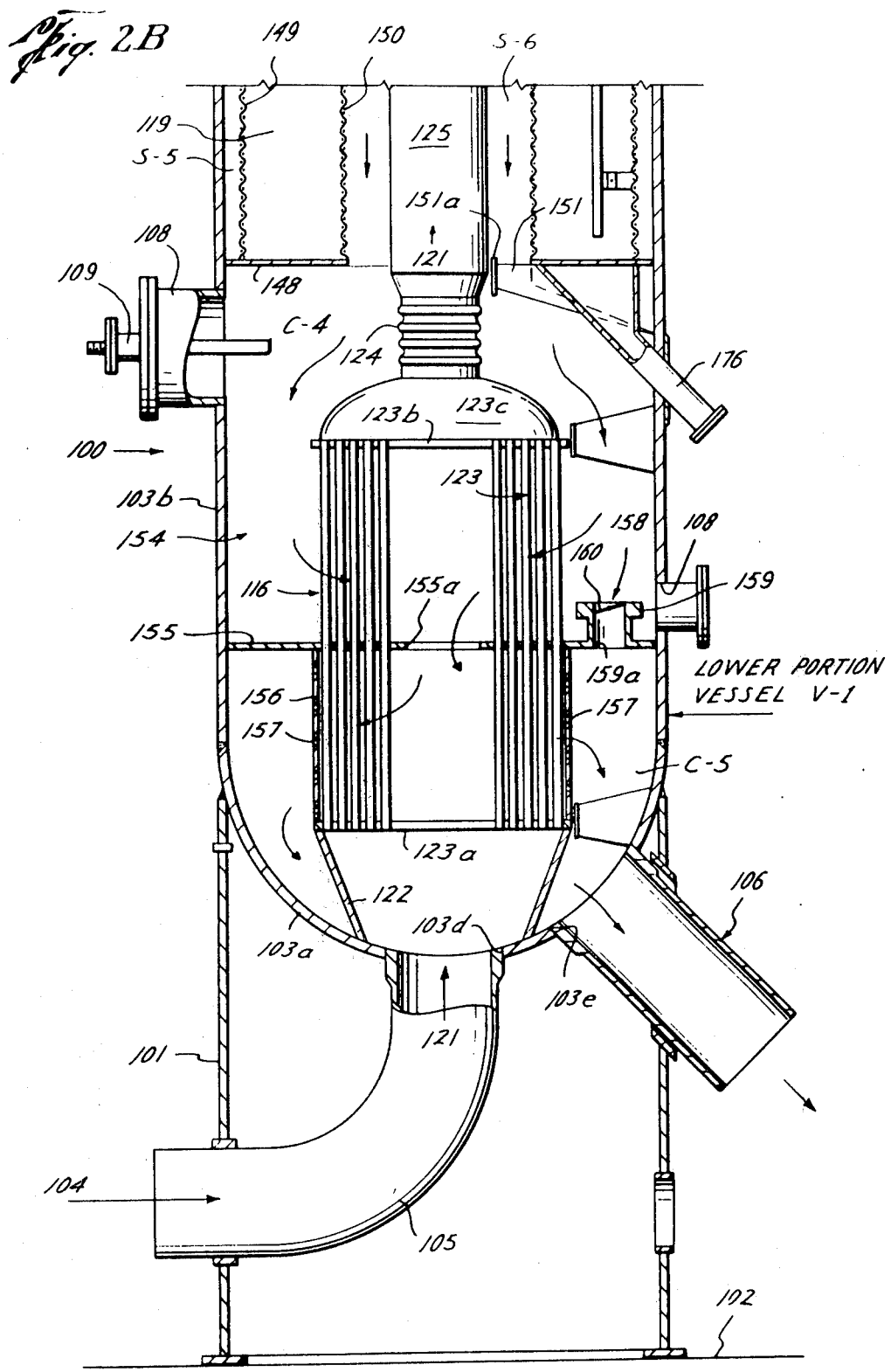

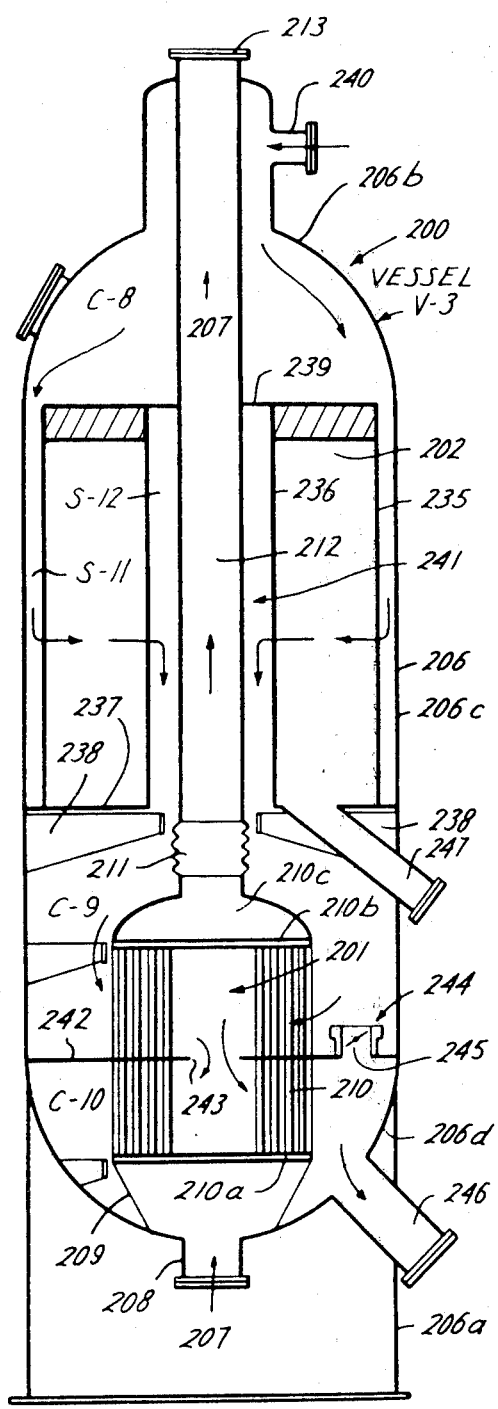
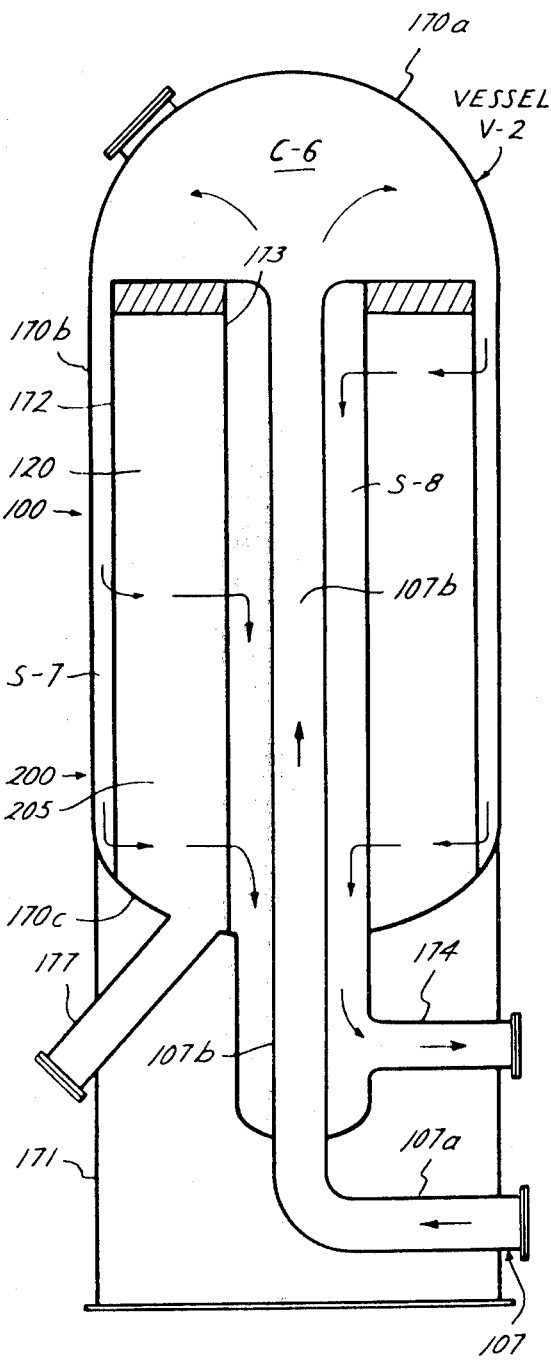

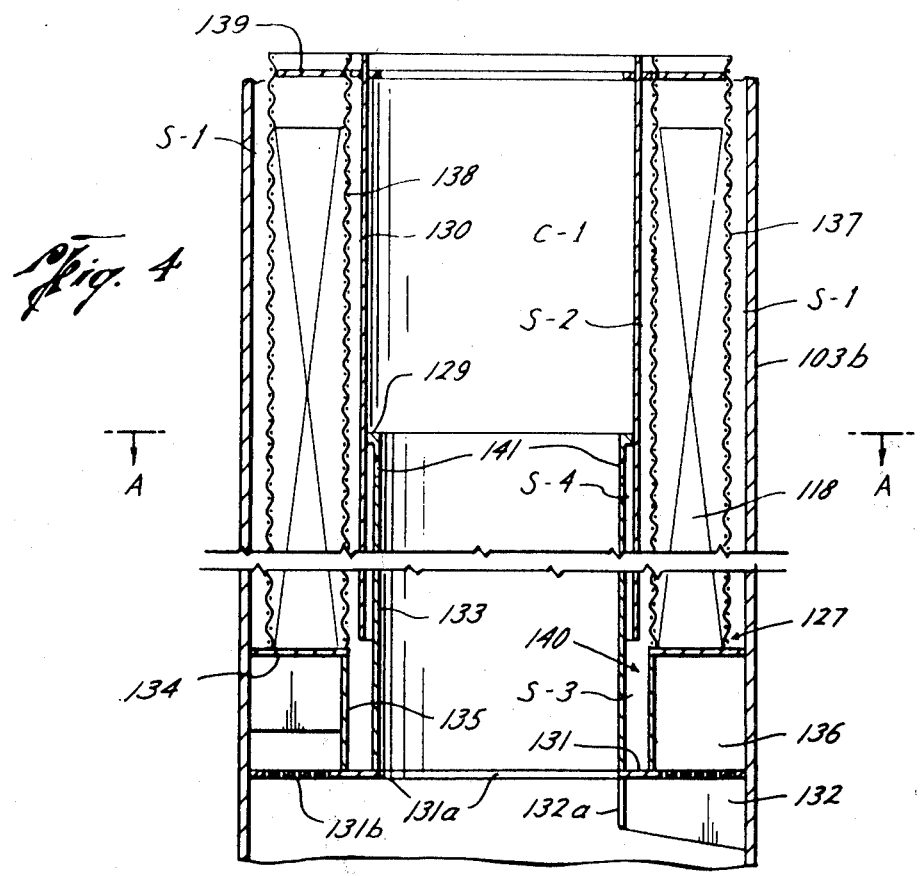
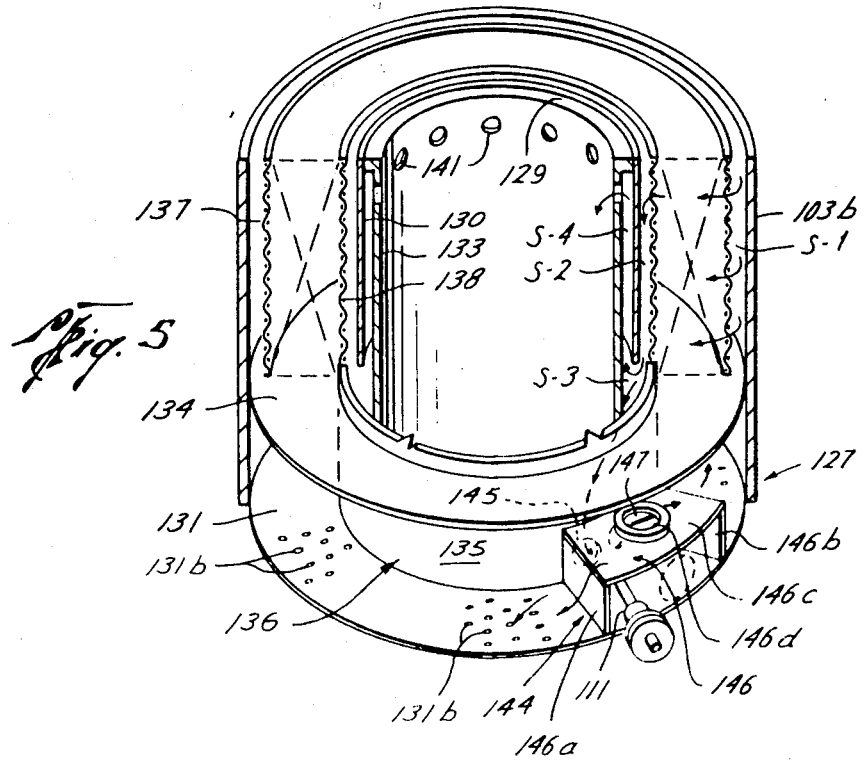

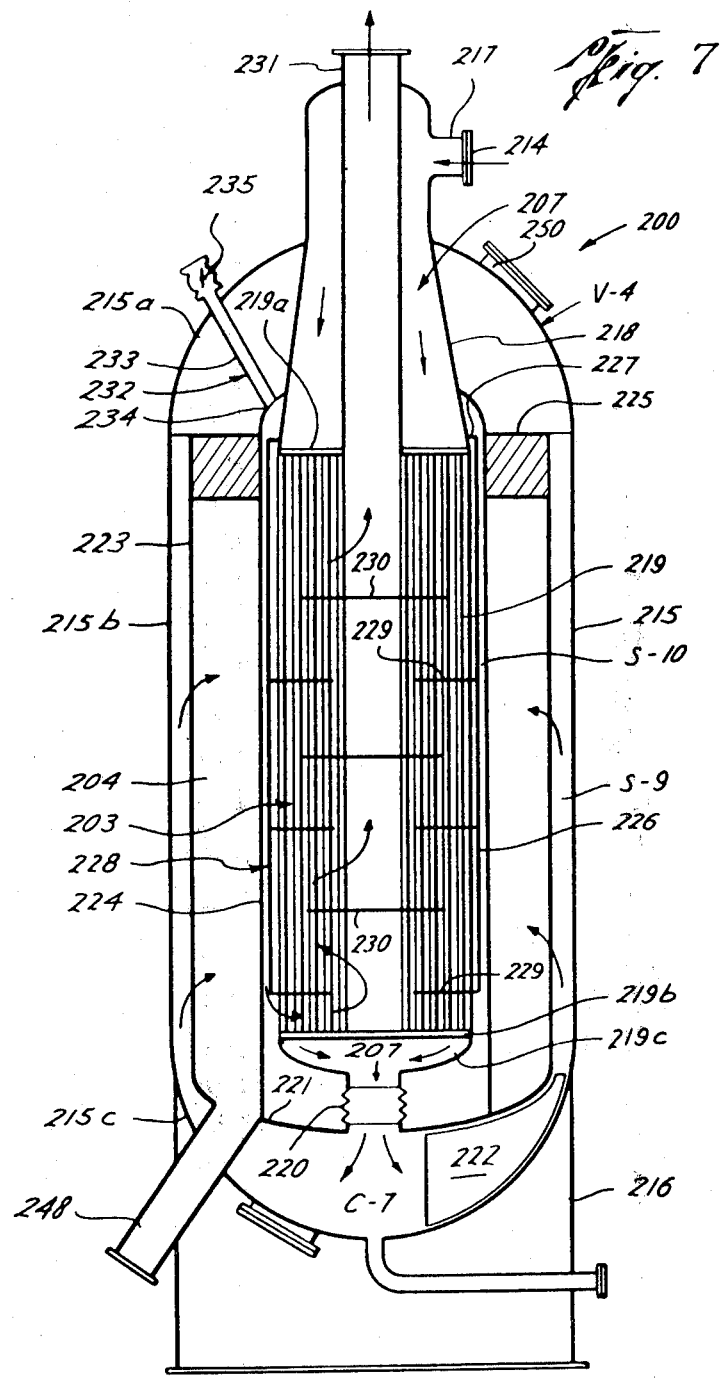

RADIAL AMMONIA CONVERTERS

This is a division of application Ser. No. 925,137, filed July 17, 1978 now U.S. Pat. No. 4,230,669 issued Oct. 28, 1980.

CROSS-REFERENCE TO RELATED PATENT APPLICATION

This application is related to U.S. patent application Ser. No. 925,128, now U.S. Pat. No. 4,230,680, which is entitled "Low Energy Process for Synthesis of Ammonia".

BACKGROUND OF THE INVENTION

1. Field of the Invention

This invention relates to ammonia converters. Specifically, the ammonia converters of this invention are the radial design where the ammonia synthesis gas flows radially through the catalyst beds. Further, the design is full flow, meaning all the synthesis gas feed passes through the first catalyst bed, all the effluent from the first catalyst bed passes through the second catalyst bed and all the effluent from the second catalyst bed passes through the third catalyst bed.

2. Prior Art

U.S. Pat. No. 3,372,988 assigned to Haldor Topsoe discloses an apparatus for ammonia gas synthesis which includes a plurality of annular-shaped, vertically-spaced catalyst beds through which the synthesis gas feed is passed at least in part in a radially outward direction; temperature control of the synthesis gas or catalyst effluent is controlled by the addition of quench gas. The same or an apparatus similar to that of U.S. Pat. No. 3,372,988 is disclosed in the November 1974 issue of Petroleum International, Volume 14, in an article entitled "Radial Converter Shows Big Benefits for Ammonia". A modified version of this converter, which is known as the "Topsoe" converter in the industry, is generally described in the May/June 1976 issue of Nitrogen, in an article entitled "Modified Topsoe Converter Increases Yields". As understood, the modified Topsoe converter utilizes alternating radial flow through each of separate, annular-shaped catalyst beds. An intermediate heat exchanger is utilized in this modified Topsoe converter to heat a secondary quench gas for controlling the temperature of the synthesis gas feed.

The book "Ammonia Part III", edited by A. V. Slack and G. Russell James, published by Marcel Decker, Inc., 1977, also illustrates Topsoe converters on pages 346–347. The Topsoe converter shown on page 346 utilizes radially outward flow; and, the Topsoe converter shown on page 347 utilizes radially outward flow in a first bed and radially inward flow in a second bed. A radial flow ammonia converter designed by Chemoprojekt is illustrated on page 355 of "Ammonia Part III". In the Chemoprojekt unit, a first heat exchanger is positioned radially below an annular-shaped catalyst bed and a second heat exchanger is located at the top of the catalyst bed, which also receives quench gas flow. The Braun adiabatic synthesis converter illustrated on page 365 of the same book utilizes downflow through the catalyst bed. The OSW ammonia converter illustrated on page 315 utilizes interbed heat transfer with axial flow through annular-shaped catalyst beds.

U.S. Pat. No. 3,918,918 discloses a catalytic reactor for processes such as ammonia synthesis which includes a two-stage, single catalyst bed and heat exchanger positioned within a single vessel. In the catalytic reactor of U.S. Pat. No. 3,918,918, the synthesis gas feed is passed through a heat exchanger and then mixed with a second feed line prior to successively passing radially outwardly through first and second stages of the catalytic bed. The combined feed gas stream is passed through the tube side of the initial heat exchanger for heating the entering feed gas prior to passing to the second stage catalytic bed.

U.S. Pat. No. 3,754,078 discloses a vessel containing an annular catalyst bed utilizing gradation of the surface of the catalyst bed exposed to flow for a more uniform distribution of gas through the bed.

U.S. Pat. No. 3,567,404 illustrates a reactor vessel which includes a heat exchanger and a series of catalytic reaction beds having entrance areas disposed parallel to the longitudinal axis of the outer and inner vessel shells for the purpose of providing reactant gas flow through consecutive catalyst beds in a direction perpendicular to the longitudinal axis of the vessel. U.S. Pat. Nos. 3,784,361; 3,964,169; 3,475,136; and 3,031,274 illustrate ammonia synthesis converters or vessels which utilize catalyst zones providing for axial gas flow therethrough.

The utilization of annular-shaped catalyst beds for ammonia synthesis is thus known in the art. See, in addition, U.S. Pat. Nos. 3,998,932 and 3,941,869 which disclose catalytic processes for the synthesis of ammonia utilizing annular-shaped catalyst beds. U.S. Pat. Nos. 3,944,394; 3,844,936; and 2,279,153 disclose the use of annular-shaped catalyst beds in other fields.

SUMMARY OF THE INVENTION

The ammonia converter system of this invention includes first, second and third annular-shaped ammonia synthesis catalyst beds utilized in combination with first and second heat exchange means, interchangers, for cooling at least a portion of the effluent of the second and first catalyst beds, respectively. Synthesis gas flows radially inwardly through the first catalyst bed to produce a first catalyst bed effluent. A first effluent transfer means is provided for transferring the first catalyst bed effluent to the second catalyst bed and includes a heat exchange means or interchanger for cooling at least a portion of the first catalyst bed effluent prior to introduction of the effluent into the second catalyst bed. A second effluent transfer means is provided for directing the second catalyst bed effluent to the third catalyst bed. The second effluent transfer means includes a first heat exchange means or interchanger which is positioned adjacent to the second catalyst bed for cooling at least a portion of the second catalyst bed effluent prior to introduction of the effluent into the third catalyst bed. Each of the first and second effluent transfer means further includes flow control means for bypassing a portion of the first and second catalyst bed effluent past the first and second heat exchange means or interchangers in order to control the temperature of effluent entering the second and third catalyst beds. In one embodiment, the ammonia converter system of this invention includes first and second interchangers and first and second catalyst beds mounted within a single vessel; and, in another embodiment, the first interchanger and second catalyst bed are mounted within one vessel and the second interchanger and first catalyst bed are mounted within a second vessel. In both embodiments, the radial ammonia converter system is completed by a third catalyst bed in a separate vessel.

BRIEF DESCRIPTION OF THE DRAWINGS

FIGS. 2A and 2B are upper and lower sectional views of a first ammonia converter vessel illustrating a first embodiment of an ammonia converter system of this invention;

FIG. 3 is a sectional view of a vessel utilized in conjunction with the vessel in FIGS. 2A and 2B of the vessels in FIGS. 6 and 7 to provide an ammonia converter system of this invention;

FIG. 4 is a sectional view of the support assembly for the second interchanger and first catalyst bed of the ammonia converter vessel of FIGS. 2A and 2B;

FIG. 5 is a sectional view taken along lines A—A of FIG. 4 which includes the details of the flow control means for the first catalyst bed effluent in the ammonia converter vessel of FIGS. 2A and 2B;

FIG. 6 is a sectional view of a first vessel illustrating a second embodiment of an ammonia converter system of this invention; and, FIG. 7 is a sectional view of the second vessel of the second embodiment of an ammonia converter system, the vessels of FIG. 6 and FIG. 7 being used in conjunction with the vessel of FIG. 3.

DESCRIPTION OF THE PREFERRED EMBODIMENT

Figure 1:
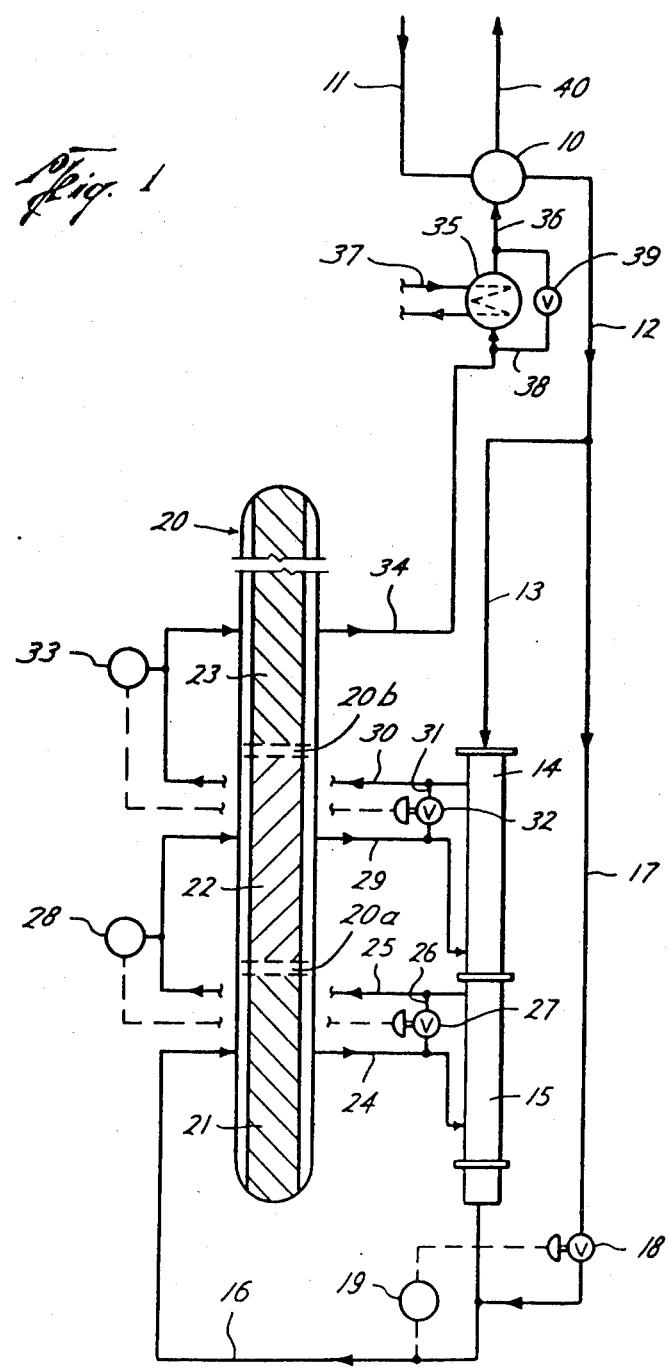
FIG. 1 is a process schematic for the synthesis of ammonia wherein the present invention of a radial ammonia converter system may be utilized.

FIG. 1 is a flow diagram of a process that may be utilized in the radial converter systems 100 and 200 of this invention for producing ammonia from a synthesis gas feed. Preparation of the synthesis gas feed, which is a gas mixture of hydrogen and nitrogen, may be carried out in a variety of known ways. Natural gas or naphtha may be steam reformed to produce the hydrogen and nitrogen mixture; also, the synthesis feed gas can be produced by partial oxidation of fuel oils or coal or by simply mixing hydrogen and nitrogen from separate sources. In any event, the synthesis mixture is a mixture consisting essentially of hydrogen and nitrogen in approximately a 3 to 1 ratio. For best results, these two gases would be the only gases present, although in most commercial operations, small amounts of other gases are present.

Utilizing the process, the synthesis of ammonia is carried out in three catalyst beds wherein the exothermic ammonia synthesis reaction occurs to produce effluent containing ammonia. The process is designed so that the temperature conditions of synthesis gas and catalyst effluent may be optimized under changing conditions within the catalyst beds or interchangers. Such temperature control is attained, without resorting to the use of quench gas, by cooling a portion of the effluent from each catalyst bed and mixing the cooled portion with the remainder of the effluent prior to entry into the next catalyst bed.

In the schematic of FIG. 1, a first heat exchanger stage 10 may be a heat exchanger adapted to receive on the tube side synthesis feed gas from incoming line 11. The exchanger 10 is used to partially raise the synthesis feed gas to a first reaction temperature as the synthesis feed gas flows into line 12. The synthesis gas from feed line 12 passes through line 13 and then the tube side of a first process heat exchanger or interchanger 14. The heated synthesis gas is heated further in another heat exchanger or interchanger 15 and exits through line 16. A bypass line 17 connects line 12 to heat exchange exit line 16 and includes a control valve 18 for controlling the volumetric amount of gas flow which bypasses the heat exchangers 14 and 15. Temperature monitoring instrumentation 19 (e.g. a thermocouple) is mounted in exit line 16 and is operably connected to the control valve 18 mounted in line 17 in order to control the volume of feed gas which proceeds directly from line 12 to line 16. Thus, the synthesis feed gas is raised to a first reaction temperature.

The heated synthesis gas is directed from line 16 into the ammonia converter(s) 20. The ammonia converter(s) 20 is schematically shown (the number of vessels may be one or two or even three) but will include three catalyst beds: first catalyst bed 21; second catalyst bed 22 and third catalyst bed 23. Each catalyst bed is annular such that the synthesis gas passes radially therethrough. Each catalyst bed is separate from the other as illustrated schematically at 20a and 20b. The types of catalyst utilized in catalyst beds 21, 22, and 23 may be the iron and promoted iron catalyst which are well-known in the art. The small sized catalyst (1.5–6 mm) is preferred.

The synthesis gas which has been heated to a first reaction temperature of between 315° and 400° C. enters the first catalyst bed 21 through line 16 and passes radially through catalyst bed 21. As the synthesis gas passes through the catalyst bed 21, an exothermic reaction occurs to produce an effluent containing 4 to 8% ammonia depending on the specific plant design. The first effluent passes outwardly through first catalyst bed exit line 24. The first catalyst bed exit line 24 may be connected to the shell side of the heat exchanger 15. A portion of the first effluent is cooled in heat exchanger 15 and passes outwardly through exit line 25. The cooled first effluent is passed by line 25 to the second catalyst bed 22.

A bypass line 26 having bypass valve 27 mounted therein is attached to the first catalyst bed exit line 24 and to the heat exchanger exit line 25. Temperature controlling instrumentation 28 is mounted in the heat exchanger exit line 25 downstream of line 26 and is operably connected to the valve 27 in bypass line 26 to control the direct transfer of first effluent from first catalyst bed exit line 24 to the heat exchanger exit line 25, thus allowing some effluent to bypass the heat exchanger 15 as is necessary to control the temperature of the effluent entering the second catalyst bed 22 so that the effluent enters the second catalyst bed 22 at a second reaction temperature which is attained as a result of the mixing of the portion of the first catalyst bed effluent cooled in heat exchanger 15 and the remainder which bypasses the heat exchanger through line 26. If at any time the condition of the catalyst in bed 22 requires that the second reaction temperature be higher, less of the effluent portion is passed through the heat exchanger 15 and more of the effluent gas flows through the bypass line 26 directly to line 25 thereby raising the second reaction temperature.

The first effluent which is maintained at a second reaction temperature of between 315° and 400° C. enters the second catalyst bed 22 through line 25 and is passed radially therethrough. The hydrogen and nitrogen in the effluent is exothermically reacted in the presence of the catalyst therein to produce a second effluent which contains between 6 and 10% ammonia, or an increase of 2 to 6% over the amount of ammonia in the first effluent. This second effluent exists the second catalyst bed through exit line 29. The exit line 29 may be connected to the shell side of heat exchanger 14 which has an exit line 30 connected to the inlet of the third catalyst bed 23.

A portion of the second effluent is cooled in heat exchanger 14 and exits the heat exchanger by line 30. A bypass line 31 having bypass valve 32 mounted therein extends between the second catalyst bed exit line 29 and the heat exchanger exit line 30 providing for the direct transfer of effluent from the second catalyst bed 22 to line 30, wherein a mixing of the bypassed effluent and the cooled effluent portion occurs to control the temperature of the second effluent entering the third catalyst bed 23. Suitable temperature control instrumentation 33 is mounted in line 30 in operative connection with the valve 32 for controlling the amount of effluent flowing through bypass line 31.

The second effluent, after mixing in line 30 of the part which has been cooled in the heat exchanger 14 and the remainder which is passed directly to third catalyst bed entry line 30 through bypass line 31, is at a third reaction temperature of between 315° and 400° C. The second effluent is then passed radially through the third catalyst bed 23 to produce a third effluent which contains between 8 and 14% ammonia or a still further increase of ammonia over the amount in the second effluent. This third effluent exits outwardly through the third catalyst bed exit line 34. The third effluent contains ammonia gas generated from each of the three catalytic reactions. This final effluent may then be processed in a known manner for the recovery of the synthesized ammonia. Prior to the removal of the ammonia from the effluent, the effluent from the third catalyst bed may be passed through line 34 to the shell side of a heat exchanger 35 and then into line 36 which connects the shell side of the heat exchanger 10. The heat exchanger 35 may be connected on the tube side to various plant fluid lines 37 in order to heat other fluids such as boiler feed water as is necessary or desirable. A bypass line 38 is connected between lines 34 and 36 and includes control valve 39 for bypassing the heat exchanger 35 either partially or completely. The ammonia-containing effluent in line 36 is then passed through shell side of the heat exchanger 10 and into line 40 for direction to the subsequent recovery operations known in the art.

Therefore, the temperature of the synthesis gas and effluents is controlled in a closed loop system without the use of synthesis gas feed as quench gas. In the process described, the synthesis gas may be passed through the tube side of heat exchangers 14 and 15; however, the heat exchangers 14 and 15 may utilize fluids other than the synthesis gas such as plant water to cool the first and second catalyst bed effluent. The process has specific application to a low pressure, low energy process. The pressure used in the process is within a pressure range of 20 to 95 atmospheres. The synthesis pressure may range between 30 and 85 atmospheres and may specifically be about 35 atmospheres. The utilization of a lower pressure process provides a savings in energy due to a reduction in the capacity of compressors and other equipment needed to maintain the synthesis gas in the higher pressure range above 100 atmospheres.

Referring to FIGS. 2A, 2B, 3, 4 and 5, a first embodiment 100 of a radial ammonia converter system of this invention is illustrated. The radial ammonia converter system 100 may be used to practice the process of ammonia synthesis which has just been described. The system 100 includes the vessel V-1 illustrated in FIGS. 2A and 2B (with certain structural details being shown in FIGS. 4 and 5) and the vessel V-2 illustrated in FIG. 3.

Referring to FIG. 2A and 2B, the vessel V-1 is supported upon a cylindrical support assembly 101 which is mounted on the foundation 102. The vessel V-1 includes a bottom hemispherical head 103a, a main cylindrical shell 103b and a top hemispherical head 103c. The heads 103a and 103c may be welded to the main shell 103b. Vessel V-1 inlet means 104, the synthesis gas feed inlet to the system, is a generally L-shaped pipe section 105 which is mounted in opening 103d of the vessel bottom head 103a. The pipe section 105 corresponds to the process flow inlet line 13 of FIG. 1. Vessel outlet means 106 may be a pipe section that is positioned in opening 103e of the vessel bottom head 103a and extends through the wall of vessel support 101 for connection to inlet means 107 of vessel V-2 of FIG. 3. The outlet means 106 corresponds to process flowline 30 in FIG. 1.

The main vessel shell 103b includes openings 108 which are blind-flanged to provide access to the vessel V-1 interior. The vessel shell 103b includes thermowell housings 109, 110, 111 and 112 for positioning thermocouples at necessary locations within the vessel to record the temperatures at various positions in the vessel V-1. The top hemispherical head 103c has mounted therewith thermowell housings 113, 114 and 115.

The main vessel shell 103b and hemispherical heads 103a and 103c may be manufactured out of any suitable material capable of withstanding the high temperatures and/or corrosive atmospheres of catalytic reactions. If necessary, the vessel sections 103a-c can be insulated on the outside.

The vessel V-1 has mounted therein a first heat exchange means or interchanger 116, a second heat exchange means or interchanger 117, first catalyst bed 118 and second catalyst bed 119 which cooperate with a third catalyst bed 120 in vessel V-2 of FIG. 3 to form the radial ammonia converter system 100.

A synthesis gas transfer means generally designated as 121 is provided for directing the ammonia synthesis gas feed into vessel V-1 and through the tube side of interchanger 116 and interchanger 117 for heating the gas prior to its passing through first catalyst bed 118. The synthesis gas transfer means 121 includes inlet pipe section 105 (FIG. 2B) and the internal portion of a conical support 122 on which interchanger 116 is positioned in vessel V-1, and which prevents comingling of shell and tube side gas streams.

The interchanger 116 includes a tube bundle 123 which terminates in a lower tube sheet 123a and an upper tube sheet 123b. The tube sheets 123a and 123b support the tube bundle 123 in a vertical position when vessel V-1 is in its operating position. The lower tube sheet 123a is attached directly to the top rim of the conical support 122. A dome-shaped outlet having an outlet head 123c connected through expansion joint 124 to conduit 125. The upper end of conduit 125 (FIG. 2A) is attached to a dome-shaped inlet 126 of interchanger 117. The interchanger 117 is positioned on an internal, annular support assembly generally designated as 127, which assembly is illustrated further in FIGS. 4 and 5.

The interchanger 117 includes a tube bundle 128 which terminates in a lower tube sheet 128a and an upper tube sheet 128b. The lower tube sheet 128a is attached to the dome-shaped inlet 126. The upper header 128b seats on an upper support ledge 129 which is positioned internally of cylindrical wall 130 of support assembly 127. The area above interchanger 117 within the cylindrical wall 130 is referred to as chamber C-1. The area above the support assembly 127 and the vessel top head 103c forms chamber C-2 in which the synthesis gas feed reverses its upwardly axial flow to a downward flow for radially inward flow through first catalyst bed 118.

The synthesis gas transfer means 121 further includes the tube side of tube bundle 123, the outlet head 123c, expansion joint 124, the transfer conduit 125, the dome inlet 126, the tube side of tube bundle 128 and chamber C-1 and chamber C-2 as formed by the support assembly 127 and the shell 103b and top head 103c of vessel V-1. The synthesis gas feed is thus introduced into vessel V-1 and heated while passing through the tubes of interchanger 116, transferred through transfer conduit 125, and heated still further while passing through the tubes of interchanger 117 to a first reaction temperature for synthesis of the hydrogen and nitrogen to ammonia in the first catalyst bed 118.

The annular support assembly 127 (the details of which are shown in FIGS. 4 and 5) includes a first annular base plate 131 which is supported on a plurality of gussets 132 attached to the interior wall of the vessel shell 103b. The gussets terminate in inwardly facing plates 132a which guide and support the lower portion of interchanger 117. The base plate 131 has a central opening 131a and cylindrical support wall 133 surrounds the opening 131a and extends upwardly to the upper support ledge 129. The cylindrical wall 130 which extends from the uppermost portion of the support assembly 127 extends downwardly and spaced from wall 133 approximately to the level of an upper annular base plate 134. A cylindrical wall 135 extends between base plate 131 and upper base plate 134 forming an annular plenum 136. Extending from the upper base plate 134 are an outer cylindrical catalyst retainer wall 137 and an inner cylindrical catalyst retainer wall 138. The retainer walls 137 and 138 are permeable walls having a plurality of openings such as a cylindrical plate having hundreds of openings to aid in the distribution and radial flow and which may have a screen (shown in FIGS. 2A, 2B, 4 and 5) on the inner side to maintain the ammonia synthesis catalyst between retainer walls 137 and 138 to form the first catalyst bed 118. A top annular plate or cover means 139 extends from outer catalyst retainer wall 137 to within chamber C-1. A permeable plate 139a may cover chamber C-1.

The synthesis gas feed after passing through the synthesis gas transfer means 121 is distributed in the annular space S-1 between vessel wall 103b and outer catalyst retainer wall 137. The gas feed then passes radially through catalyst bed 118 wherein an exothermic reaction occurs and a first catalyst bed effluent containing ammonia flows out of the catalyst bed 118 into a first catalyst bed effluent transfer means generally designated 140. The transfer means 140 includes annular spaces S-2, S-3 and S-4. Annular space S-2 is between inner catalyst retainer wall 138 and wall 130. The flow of the first catalyst bed effluent is downwardly until it reaches the annular space S-3 between cylindrical wall 135 and support wall 133 where most of the effluent flows upwardly in annular space S-4 between wall 130 and support wall 133. At the top of support wall 133 are a plurality of openings 141 through which the first catalyst bed effluent passes for contact with the shell side of tube bundle 128. The effluent passes downwardly in a serpentine manner caused by a plurality of alternately donut-shaped baffles 142 and disc-shaped baffles 143 as the effluent is cooled and passes outwardly between base plate 131 and lower header 128a into a chamber C-3.

The first catalyst bed effluent transfer means 140 further includes a first flow control means generally designated as 144 (FIG. 2A and 5). The flow control means 144 includes an opening 145 in wall 135 wherein a portion of the first catalyst bed effluent passes into a distribution chamber enclosure 146 positioned in annular plenum 136. Distribution chamber enclosure 146 is formed by base plate 131, wall 135 and vessel shell wall 103b, enclosure side walls 146a and 146b and enclosure top wall 146c. The enclosure top wall 146c has an opening 146d with a valve or by-pass control means 147 mounted therein. The valve or by-pass control means 147 may be a damper valve or any other valve that allows a variable flow of gas through opening 146d and can be either automatically or manually operated. The valve or by-pass control means 147 is set initially to allow the design portion of the first catalyst bed effluent to by-pass the contact with the tube bundle 123. The effluent (e.g. 20% or less) passes through opening 145 into distribution chamber enclosure 146 and through valve 147 into the plenum 136. A plurality of holes 131b are in base plate 131 whereby the effluent flows out of plenum 136 into chamber C-3 to admix with that portion of the effluent which is cooled as it passes in contact with the tube bundle 128. The first catalyst bed transfer means 140 also includes temperature control means. The temperature of the first catalyst bed effluent after being mixed is measured by a thermocouple in thermocouple well 110 whereas the temperature of the effluent after leaving the catalyst bed 118 is measured by a thermocouple in thermocouple well 111. The thermocouples may be connected to a panel (not shown) for visual observation and manual adjustment of the valve 147 or automatically adjusted for controlling the temperature of the first catalyst bed effluent entering the second catalyst bed 119 by adjusting the amount of by-pass.

Referring to FIGS. 2A and 2B, the second or lower annular-shaped catalyst bed 119 is positioned below chamber C-3 and is concentric with transfer conduit 125. The catalyst bed 119 is formed by an annular bottom support or base plate 148 and outer cylindrical retainer wall 149 and inner cylindrical retainer wall 150. The retainer walls 149 and 150, respectively, are permeable walls constructed similarly as catalyst retainer walls 137 and 138 of catalyst bed 118, and are mounted on base plate 148 and extend upwardly therefrom to form an annular space therebetween for containing the ammonia synthesis catalyst similarly as first catalyst bed 118. The base plate 148 of catalyst bed 119 is supported on a plurality of inwardly extending gussets 151 attached to the inside of main vessel shell 103b. Each of the gussets 151 terminate in an inwardly facing plate portion 151a which serve as a support and guide to the transfer conduit 125. An annular top plate 152 is attached to both the cylindrical walls 149 and 150 and extends radially inwardly to attach to a slip joint guide member 153. The slip joint member 153 is circular and is mounted about the transfer conduit 125 so as to provide a seal to gas flow. The slip joint member 153 provides slight relative movement between the transfer conduit 125 and the top plate 157 upon expansion.

The first catalyst bed effluent after passing through the first catalyst bed effluent transfer means 140, with the cooled portion and non-cooled portion being re-mixed in chamber C-3, is distributed and flows into the annular space S-5 formed between outer cylindrical retainer wall 149 and the inside surface of vessel shell 103b. The effluent then passes radially through second catalyst bed 119 wherein an exothermic reaction occurs and a second catalyst bed effluent flows out of the catalyst bed 119 into a second catalyst bed effluent transfer means generally designated 154. The transfer means 154 includes annular space S-6 which is between inner catalyst retainer wall 150 and the transfer conduit 125. The flow of the second catalyst bed effluent is downward in space S-6 until it reaches chamber C-4 which is the annular space surrounding the upper portion of interchanger 116. A horizontally oriented circular plate or barrier 155 extends from the vessel shell wall 103b across the tube bundle 123. The barrier 155 is positioned approximately midway of the tube bundle 123 and includes a plurality of openings for the tubes however it provides a barrier to prevent vertical flow on the shell side of tube bundle 123 between the portion above and the portion below the barrier 155 except through an opening 155a. The opening 155a is positioned in the center of the barrier 155 so that effluent flow on the upper portion of tube bundle 123 is radially inward above the barrier 155 and radially outward below the barrier 155. The effluent flows outward through a cylindrical wall 156 having a plurality of openings 157 to allow the cooled second catalyst bed effluent to pass into chamber C-5.

The second catalyst bed effluent transfer means 154 further includes a flow control means 158. The flow control means 158 includes a by-pass flange assembly 159 mounted on barrier 155. The flange assembly 159 has an opening 159a which extends between chamber C-4 and chamber C-5, and mounted within the opening 159a is a by-pass valve 160. The by-pass valve 160 may be a damper valve or other suitable type valve which is adjustable to allow a portion (e.g. less than 20%) of the second catalyst bed effluent to flow from chamber C-4 to chamber C-5 without contacting the tube bundle 123. The effluent which by-passes the tube bundle 123 is admixed with the effluent cooled by contacting tube bundle 123 in chamber C-5 and the admixed and cooled second catalyst bed effluent exits the vessel V-1 by line 106. The second catalyst bed effluent transfer means 154 also includes temperature control means. The temperature of the second catalyst bed effluent prior to entering the third catalyst bed 120 is measured and the temperature of the effluent leaving the second catalyst bed 119 is measured by a thermocouple in thermocouple well 109. Valve 160 is adjusted either manually or automatically to control the amount of second catalyst bed effluent for by-pass to control the temperature of the second catalyst bed effluent entering the third catalyst bed 120.

The effluent from the second catalyst bed 119 flows outwardly of vessel outlet 106 and through suitable piping (not shown) into inlet 107 of vessel V-2 (FIG. 3) of the first embodiment 100. The vessel V-2, which is illustrated in FIG. 3, is a generally cylindical vessel including upper head 170a, main shell 170b and lower head 170c supported on a base 171. The vessel inlet 107 includes as L-shaped pipe section 107a and a vertical pipe section 107b. Effluent entering the vessel inlet 107 flows through L-shaped pipe section 107a and then upwardly through section 107b and outwardly into chamber C-6 at the top of the vessel V-2. A third catalyst bed generally designated as 120 is mounted on the lower head 170c of vessel V-2. The third, annular-shaped catalyst bed 120 is formed by outer cylindrical retainer wall 172 which is spaced from the main shell 170b and inner cylindrical retainer wall 173 for housing catalyst. Both catalyst retainer walls 172 and 173 are permeable walls, similarly as catalyst retainer walls 137 and 138 described previously.

The second catalyst bed effluent which has entered vessel V-2 through vessel inlet 107 and the chamber C-6 flows downwardly into annular space S-7 formed between the interior of main shell portion 170b and the outer cylindrical retainer wall 172. The effluent then flows radially inwardly through the catalyst bed 120 into annular area S-8 formed between the inlet section 107b and the inner cylindrical retainer wall 173. The hydrogen and nitrogen in the effluent is catalytically reacted in order to form additional ammonia for the third time, and the third catalyst bed effluent flows downwardly through the annular space S-8 and outwardly through outlet conduit 174. The third catalyst bed effluent flowing outwardly through conduit 174 flows to known ammonia recovery equipment or, as an alternative, may flow through a plant heat exchanger 35 and through a preheater 10 as described with respect to FIG. 1.

The actual size of each catalyst bed and each interchanger is determined by the volume of catayst and the gas flow rates needed to meet process requirements for ammonia synthesis. The size of the catalyst and the thickness of the beds are also determined by such process requirements including flow and pressure drop parameters determined by overall process requirements. Each catalyst bed 118, 119 and 120 has a catalyst removal or dropout section 175, 176 and 177, respectively. Thus, in each vessel there is an access opening above each catalyst bed for loading from the top of the bed.

Referring now to FIGS. 6, 7, and 3 another embodiment 200 of this invention is illustrated. The ammonia converter system of second embodiment 200 includes a first heat exchanger or interchanger 201 and second catalyst bed 202 in vessel V-3 of FIG. 6, a second heat exchanger or interchanger 203 and first catalyst bed 204 in vessel V-4 of FIG. 7 and a third catalyst bed in vessel V-2 of FIG. 3, referred to as catalyst bed 205 for the purpose of this system. The embodiment 200 is also designed to practice the ammonia process of FIG. 1.

The vessel V-3 of FIG. 6 includes a cylindrical vessel 206 mounted on a cylindrical vessel support 206a. The vessel 206 includes an upper head 206b, main cylindrical vessel shell 206c and bottom head 206d. The ammonia synthesis gas is introduced by synthesis gas transfer means 207 into the system 200 through the tube side of interchanger 201 of vessel V-3 and then through the tube side of interchanger 203 of vessel V-4 for heating the gas prior to its passing through the first catalyst bed 204. The synthesis gas transfer means 207 includes a bottom vessel inlet 208 in vessel V-3. The feed gas inlet 208 opens into an internal conical support chamber 209, which supports a first interchanger 201. The interchanger 201 includes a tube bundle 210 which terminates in a lower tube sheet header 210a and an upper tube sheet header 210b. The tube sheets 210a and 210b support the tube bundle 210 in a vertical position when vessel V-3 is in its operating position. The lower tube sheet 210a is attached directly to the top rim of the conical support 209. An elliptically outlet head 210c is mounted over the upper tube sheet 210b.

The outlet head 210c is connected through an expansion joint 211 to the lower end of a transfer conduit 212. The upper end of conduit 212 terminates in a flange 213 outside the vessel V-3 for connecting suitable piping (not shown) between vessel V-3 and flange 214 of vessel V-4. The synthesis gas transfer means 207 thus includes bottom vessel inlet 208 in vessel V-3, the conical support chamber 209, the tube side of tube bundle 210, the outlet head 210c, expansion joint 211, transfer conduit 212 and the piping (not shown) between flange 213 of vessel V-3 and flange 214 of vessel V-4.

Referring to FIG. 7, the vessel V-4 includes a cylindrical vessel 215 which is supported on a cylindrical support structure 216. The vessel 215 includes an upper vessel head 215a, a main cylindrical shell 215b and a bottom head 215c. The upper vessel head 215a includes a feed gas inlet 217 which includes flange 214 and opens into a conical tube-side inlet structure 218 for second interchanger 203 which is positioned vertically within the vessel 215. Second interchanger 203 includes a tube bundle 219, with an upper tube sheet 219a connected to inlet structure 218 and a lower tube sheet 219b. The lower tube sheet 219b of the second interchanger 203 terminates at its bottom end in a dome-shaped outlet 219c and expansion joint 220, all of which is connected to a bottom semi elliptical shaped internal head 221 supported on a plurality of radially extending support gussets 222.

The gas transfer means 207 further includes feed gas inlet 217 of vessel V-4, conical inlet structure 218, the tube side of tube bundle 219, the dome-shaped outlet 219c, expansion joint 220 and chamber C-7, the area below the expansion joint 220 formed by the bottom head 215c of vessel V-4 and bottom internal head 221. The synthesis gas is thus introduced into the bottom of vessel V-3 and head while passing upwardly axially through the tubes of interchanger 201 and then transferred through transfer conduit 212 to the piping connecting vessel V-3 and vessel V-4. The synthesis gas is then passed downwardly in vessel V-4 and heated while passing through the tubes of interchanger 203 to a first reaction temperature for partial synthesis of the hydrogen and nitrogen to ammonia in the first catalyst bed 204.

An annular-shaped first catalyst bed 204 is supported within the V-4 vessel 215 on bottom internal head 221 and is positioned concentrically about the second interchanger 203. The catalyst bed 204 is formed by outer cylindrical catalyst retainer wall 223 and an inner cylindrical catalyst retainer wall 224. Catalyst retainer walls 223 and 224 are permeable walls, similarly as catalyst retainer walls 137 and 138 described previously, above, and are mounted on bottom internal head 221 which is supported by gussets 222. A top annular plate or cover means 225 covers the catalyst bed 204 extending from the main shell 215b. An annular plenum means 226, positioned between the catalyst bed 204 and interchanger 203, which includes a rim 227 mounted to the upper tube sheet 219a to form an annular plenum radially inwardly from catalyst bed 204 for flow upwardly or downwardly in the plenum.

The synthesis gas feed after passing into the system 200 through the synthesis gas transfer means 207 is diverted in chamber C-7 of vessel V-4 (FIG. 7) to the outer annular space S-9 between main shell 215b and outer catalyst retainer wall 223. The gas then passes radially through catalyst bed 204 wherein an exothermic reaction occurs and a first catalyst bed effluent containing ammonia flows out of catalyst bed 204 into a first catalyst bed effluent transfer means generally designated 228. The transfer means 228 includes annular space S-10 between the inner catalyst retainer wall 224 and the plenum means 226. The flow in the plenum or space S-10 for the major portion of the effluent is downward until it reaches the lower part of tube bundle 219 where the effluent flows upwardly in contact with the shell side of tube bundle 219. Donut baffles 229 and disk baffles 230 aid the radial flow inwardly and outwardly as the first catalyst bed effluent flows upwardly in a serpentine manner until the effluent reaches outlet 231.

The first catalyst bed effluent transfer means 228 further includes a first flow control means generally designated as 232. The flow control means 232 includes a by-pass line 233 attached to an upper head 234 which is mounted on cover means 225 and sealingly engages conical inlet structure 218, wherein a small portion (e.g. 20% or less) of the first catalyst bed effluent passes upwardly in plenum or space S-10 and then out of vessel V-4 through by-pass line 233 and by-pass valve 235. The first catalyst bed effluent passing through the by-pass line 233 is combined with the effluent which has been cooled and passes out through outlet 231. The transfer means 228 may also include temperature control means (not shown) similarly as was described in regard to embodiment 100.

Referring to FIG. 6, the vessel V-3 has an annular-shaped second catalyst bed 202 supported in the upper portion. The catalyst bed 202 is formed by outer cylindrical retainer wall 235 and an inner cylindrical retainer wall 236 which extend upwardly from annular base plate 237. Catalyst retainer walls 235 and 236 are permeable walls, similarly as catalyst retainer walls 137 and 138 described previously. Base plate 237 and the catalyst bed 202 are supported in vessel V-3 on a plurality of gussets 238 which extend inwardly from vessel shell 206c. An annular upper plate 239 closes the top of catalyst bed 202 and forms a gas seal around transfer conduit 212.

The first catalyst bed effluent after passing through first catalyst bed transfer means 228 enters vessel V-3 through inlet 240 into chamber C-8. Chamber C-8 is formed between the vessel head 206b and the upper plate 239 which diverts the effluent into the annular space S-11 between the vessel shell 206c and the outer cylindrical retainer wall 235. The first catalyst bed effluent is then passed radially through second catalyst bed 202 wherein the hydrogen and nitrogen in the effluent react in an exothermic reaction to form additional ammonia. The second catalyst bed effluent flows out of catalyst bed 202 into a second catalyst bed effluent transfer means generally designated 241. The transfer means 241 includes annular space S-12 which is between inner cylindrical retainer wall 236 and the transfer conduit 212. The effluent flows downward in space S-12 to chamber C-9 which is below the catalyst bed 202. A barrier 242 extends inwardly from vessel shell 206c to an opening 243 midway between the upper and lower tube sheets of tube bundle 210. The barrier 242 prevents vertical flow on the shell side of tube bundle 210 between the portion above and the portion below the barrier 242 except through the opening 243. The second catalyst bed effluent thus flows radially inward above the barrier 242 and radially outward below the barrier 242 into a chamber C-10, the area formed between the vessel bottom head 206d and interchanger 201 and its support 209.

The second catalyst bed effluent transfer means 241 further includes a flow control means 244. The flow control means 244 is a by-pass pipe mounted in barrier 242 having a valve 245 therein. The by-pass valve 245 may be a damper valve or other suitable type which is adjustable to allow a portion (e.g. less than 20%) of the second catalyst bed effluent to flow from chamber C-9 to chamber C-10 without contacting tube bundle 210. The effluent which bypasses the tube bundle 210 through control means 244 is admixed in chamber C-10 with the effluent cooled by contacting the tube bundle 210. The admixed and cooled second catalyst bed effluent exits vessel V-3 by line 246 at a temperature desired for the second catalyst bed effluent to enter the third catalyst bed 205 in vessel V-2, illustrated in FIG. 3.

The description of vessel V-2 need not be repeated since it is the same in the system 200 embodiment as described in the system 100 embodiment. Each catalyst bed 202, 204 and 205 in this embodiment has a catalyst dropout section 247, 248 and 177, respectively. Furthermore, each vessel has an access opening (249 in vessel V-3, 250 in vessel V-4 and 251 in Vessel V-3) above the catalyst bed for loading the bed with catalyst.

The foregoing disclosure and description of the invention are illustrative and explanatory thereof, and various changes in the size, shape and materials as well as in the details of the illustrated construction may be made without departing from the spirit of the invention.

We claim:

1. An ammonia converter, comprising:
   a vessel which includes a lower head, a main shell and an upper head;
   an internal annular catalyst bed formed by an outer cylindrical wall mounted on said lower head spaced from said main shell to form an annular space between said catalyst bed and said shell and an inner cylindrical retainer wall;
   catalyst removal means extending from said lower head;
   gas inlet means which includes a vertical pipe section along the axis of said vessel and spaced from said annular catalyst bed and means for directing gas to said annular space between said catalyst bed and said shell; and
   outlet means which extend below said lower head concentric with said outlet means for removing the effluent from said catalyst bed.

2. An ammonia converter, comprising:
   a vessel which includes a bottom head, a main shell and an upper head;
   an internal annular catalyst bed mounted to said main shell, said bed being spaced from and parallel to said main shell;
   an interchanger mounted in said vessel which includes a vertically positioned tube bundle;
   gas transfer means for passing gas in one direction axially through said vessel and includes the tube side of said tube bundle and a transfer conduit flexibly joined to said interchanger which extends through and is spaced from said annular catalyst bed;
   cover means extending from said gas transfer means which covers said annular catalyst bed;
   synthesis gas transfer means including inlet means in said top head for introducing synthesis gas at the top of said vessel and diverting said gas by said cover means into the space between said main shell and said outer cylindrical wall of said catalyst bed; and
   catalyst bed transfer means including outlet means in said bottom head for removing said catalyst bed effluent and contacting the outside of said tube bundle before passing through said outlet means.

3. An ammonia converter as set forth in claim 2, including:
   barrier means extending inwardly from said main shell between the upper and lower tube sheets of said tube bundle.

4. An ammonia converter as set forth in claim 3, including:
   by-pass means for by-passing a portion of the catalyst bed effluent out of said vessel without contacting said tube bundle.

5. An ammonia converter, comprising:
   a vessel which includes a bottom head, a main cylindrical shell and a top head;
   an internal annular catalyst bed formed by an outer cylindrical wall mounted on an internal head supported by gussets mounted on said bottom head to form an annular space between said catalyst bed and said shell and an inner cylindrical retainer wall;
   an interchanger mounted within the annulus of said catalyst bed and spaced from said bed which includes a vertically positioned tube bundle;
   gas transfer means which includes inlet means in said top head for passing gas downwardly through the tubes of said tube bundle and between said internal head and said bottom head to said annular space between said catalyst bed and said shell; and
   effluent transfer means for passing the major portion of the catalyst bed effluent on the shell side of said tube bundle and then upwardly out of said vessel.

6. An ammonia converter as set forth in claim 5, wherein: said inlet means of said gas transfer means is concentric to the axial outlet of said gas transfer means.

* * * * *